Figure 1:
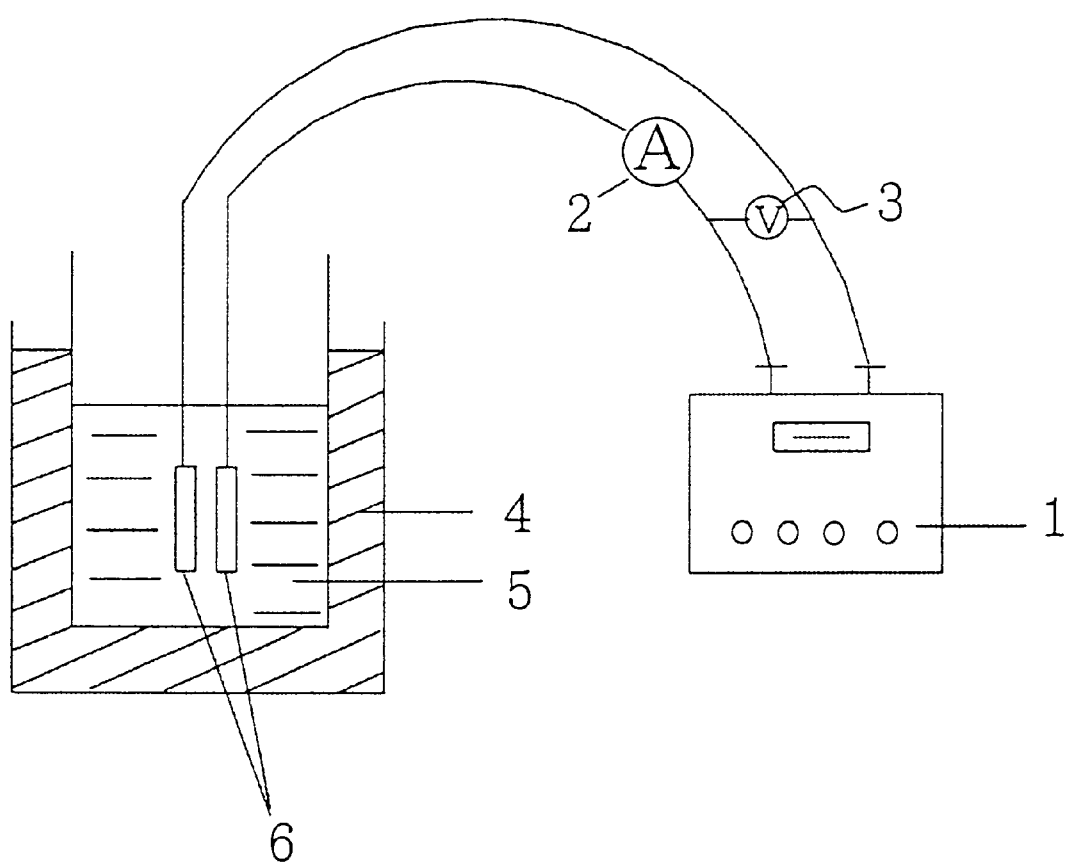

United States Patent
Tsuzuki et al.

[11] Patent Number: 6,048,626
[45] Date of Patent: Apr. 11, 2000

[54] POLYESTER COMPOSITION AND FILM MADE THEREFROM

[75] Inventors: Toshihiro Tsuzuki, Kyoto; Yuzo Shimizu, Shiga; Takashi Ueda, Gifu; Tsutomu Morimoto, Shiga, all of Japan

[73] Assignee: Toray Industries, Inc., Japan

[21] Appl. No.: 09/297,349

[22] PCT Filed: Aug. 7, 1998

[86] PCT No.: PCT/JP98/03523
§ 371 Date: Apr. 29, 1999
§ 102(e) Date: Apr. 29, 1999

[87] PCT Pub. No.: WO99/15590
PCT Pub. Date: Jan. 4, 1999

[30] Foreign Application Priority Data

Sep. 25, 1997 [JP] Japan ................................. 9-260011
Jan. 21, 1998 [JP] Japan ................................. 10-009696

[51] Int. Cl.[7] ............................. B32B 27/06; C08K 3/32
[52] U.S. Cl. ......................... 428/480; 525/437; 525/444; 525/444.5; 524/414; 524/417; 524/425; 523/220; 523/221; 523/333; 430/97
[58] Field of Search ..................... 525/437, 444, 525/444.5; 524/414, 417, 425; 523/220, 221, 333; 428/480; 430/97

[56] References Cited

U.S. PATENT DOCUMENTS 3,876,608  4/1975  Anderson et al. .

FOREIGN PATENT DOCUMENTS

| 49 42752 | 4/1974 | Japan . |
|---|---|---|
| 9-57922 | 3/1997 | Japan . |
| 9-171939 | 6/1997 | Japan . |
| 10-1598 | 1/1998 | Japan . |

*Primary Examiner*—Samuel A. Acquah
*Attorney, Agent, or Firm*—Austin R. Miller

[57] ABSTRACT

A polyester composition, comprising a thermoplastic polyester resin and hydroxy apatite particles with an average particle diameter of 0.01 to 10 μm and a specific surface area of 50 to 500 m²/g and represented by the following chemical formula, and a film made thereof. A polyester film excellent in such basic properties as slipperiness and abrasion resistance, and also in electric properties, perforability, processability as a laminate with a metallic sheet, flavor properties, etc. can be obtained.

$$Ca(PO_4)_l(OH)_m(CO_3)_nY_x$$

(where Y stands for any optional anions other than phosphate group, hydroxyl group and carbonate group, $l=0.4\sim0.6$, $m=0.1\sim0.4$, $n=0\sim0.2$, $x=0\sim0.2$, $3\times l+m+2\times n+z\times x=2$ (z is the valence of anion(s) Y))

19 Claims, 1 Drawing Sheet

POLYESTER COMPOSITION AND FILM MADE THEREFROM

TECHNICAL FIELD

The present invention relates to a polyester composition capable of being used suitably for various industrial applications, and a film made thereof. In more detail, the object of the present invention is to provide a polyester film excellent in such basic properties as slipperiness and abrasion resistance, and also in electric properties, perforability, processability as a laminate with a metallic sheet, flavor properties, etc.

BACKGROUND ARTS

Since polyesters such as polyethylene terephthalate have excellent physical and chemical properties, polyesters containing fine particles such as inorganic particles are widely used as fibers, films and other formed articles. Among these formed articles, films are used for magnetic recording media, capacitors, food packaging, heat sensitive mimeography and other general industries. For improving the handling convenience and the quality of these processed products, or being demanded for process passableness in the production or processing of films, it is generally practiced to add particles for making the surface of a film moderately rough or making the film or processed product thereof slippery or abrasion resistant.

The particles used generally include inorganic particles of silicon oxide, aluminum oxide, titanium oxide, calcium carbonate, barium sulfate, calcium phosphate, talc, kaolin, zeolite, calcium fluoride, lithium fluoride, molybdenum sulfide, etc., organic particles of silicone resin, fluorine resin, crosslinked polystyrene resin, crosslinked acrylic resin, etc., and also particles precipitated during polyester production.

Above all, salts such as carbonates and phosphates of elements of group IA and group IIA in the periodic table, especially phosphates are expected to be good in affinity to polyesters, because of their ionic bondability.

For example, the use of calcium phosphate particles is known in Japanese Patent Laid-Open (Kokai) Nos. 49-42752, 9-171939, etc.

As a means for improving calcium carbonate, Japanese Patent Laid-Open (Kokai) No. 10-1598 attempts to improve the running property, uniformity of surface protrusions and abrasion resistance of a film by controlling the volume average diameter, particle size distribution, content, etc. of the particles.

However, these conventional methods of using calcium phosphate particles, etc. are not satisfactory enough in the slipperiness and abrasion resistance of the obtained film. That is, it becomes difficult to achieve both sufficient slipperiness and abrasion resistance against production of shavings and coming-off of particles, when the film is passed at a high speed when produced or processed. The reason is considered to be that the affinity and adhesiveness between the particles and the polyester are still insufficient.

Especially in recent years in the area of magnetic recording tapes, higher image quality and higher density have been achieved, and polyester films are strongly required to be higher in slipperiness and abrasion resistance compared to those obtained by the conventional methods.

In addition, capacitor films are strongly required to have higher slipperiness, higher withstand voltage and higher insulation resistance in recent years while being reduced in thickness, though they have been improved in electric properties to some extent.

Furthermore, films for heat sensitive mimeographic paper are required to be excellent in perforability at low energy, uniformity in hole diameter after perforation and also in printing clearness.

Moreover, polyester films for lamination with a metallic sheet are required to be good in adhesiveness to the metallic sheet, free from the laminated film crystallization or deterioration, film peeling, shrinking, cracking or pinholes, etc. caused by heating after canning, and free from the film peeling or cracking caused by impact against the metallic can, and also required not to adsorb the flavor components of the contents of the can or not to impair the flavor of the contents by any component dissolved from the film or any odor emitted therefrom (hereinafter called flavor properties).

DISCLOSURE OF THE INVENTION

The present invention solves these problems, by providing a polyester film excellent in such basic properties as slipperiness and abrasion resistance, and also in electric properties, perforability, processability as a laminate with a metallic sheet, flavor properties, etc.

The object of the present invention can be achieved by a polyester composition, comprising a thermoplastic polyester resin and hydroxy apatite particles with an average particle diameter of 0.01 to 10 μm and a specific surface area of 50 to 500 m²/g and represented by the following chemical formula, and also by a film made of the polyester composition.

$$Ca(PO_4)_l(OH)_m(CO_3)_n Y_x$$

(where Y stands for any optional anions other than phosphate group, hydroxyl group and carbonate group, l=0.4~0.6, m=0.1~0.4, n=0~0.2, x=0~0.2, 3×l+m+2×n+z×x=2 (z is the valence of anion(s) Y))

THE BEST EMBODIMENTS OF THE INVENTION

The thermoplastic polyester used in the present invention is, preferably, composed of a dicarboxylic acid and a glycol, and is produced, for example, by the esterification or ester interchange reaction of a dicarboxylic acid or any of its ester forming derivatives and a glycol, and subsequent polycondensation reaction.

The thermoplastic polyester is not especially limited as far as it can be formed into articles such as films. Polyesters suitable for forming into articles such as films are obtained by using an aromatic dicarboxylic acid as the dicarboxylic acid, and include, for example, polyethylene terephthalate, polyethylene-p-oxybenzoate, polyethylene-1,2-bis(2-chlorophenoxy)ethane-4,4'-dicarboxylate, polyethylene-1,2-bis(phenoxy)ethane-4,4'-dicarboxylate, polyethylene-2,6-naphthalene dicarboxylate, polybutylene terephthalate, polycyclohexane-1,4-dimethylene terephthalate, etc. Among them, polyethylene terephthalate, polyethylene-2,6-naphthalene dicarboxylate and polybutylene terephthalate are preferable.

These polyesters can be homopolyesters and copolyesters. The comonomers used in this case include acids and glycols other than those constituting the polyester, such as aromatic dicarboxylic acids, aliphatic dicarboxylic acids and alicyclic dicarboxylic acids, aromatic glycols, aliphatic glycols and alicyclic glycols. For example, the acids include aromatic dicarboxylic acids such as terephthalic acid, isophthalic acid, naphthalenedicarboxylic acid, phthalic acid, diphenyldicarboxylic acid, diphenyletherdicarboxylic acid, diphenoxyethanedicarboxylic acid and 5-sodiumsulfoisophthalic acid, aliphatic dicarboxylic acids such as oxalic acid, succinic acid, adipic acid, sebacic acid, dimer acid, maleic acid and fumaric acid, alicyclic dicarboxylic acids such as 1,4-cyclohexanedicarboxylic acid and decalindicarboxylic acid.

The glycols include aliphatic glycols such as ethylene glycol, 1,4-butanediol, 1,5-pentanediol, neopentyl glycol, diethylene glycol, 1,6-hexanediol and 1,10-decanediol, alicyclic glycols such as 1,2-cyclohexanedimethanol, 1,4-cyclohexanedimethanol and hydrogenated bisphenol A. Among these glycols, ethylene glycol, 1,4-butanediol and 1,4-cyclohexanedimethanol can be preferably used.

Only one or two or more of the above acids and glycols can be used. The copolymer used can also be byproduced in the production of the polyester.

It is preferable that the melting point of the polyester composition of the present invention is 100 to 260° C. A more preferable range is 120 to 250° C., and a further more preferable range is 140 to 240° C. Especially when the polyester composition is used for lamination with a metallic sheet severe in requirements such as impact resistance, heat resistance and processability or used for heat sensitive mimeography severe in requirements such as hot perforability, the melting point is an important property for satisfying impact resistance, heat resistance, processability and perforability, and for improving processability and perforability by adjusting crystallinity (degree of crystallinity, crystal size, etc.). So, the use of a copolyester as the polyester is suitable.

The amount of the comonomer is not especially limited, but in view of the heat perforability, heat resistance, flavor properties, impact resistance, etc. of the obtained film, 50 mol % or less is preferable. A more preferable range is 1 to 40 mol %, and a further more preferable range is 2 to 30 mol %. An especially preferable range is 5 to 25 mol %. If the amount of the comonomer exceeds 50 mol %, the heat resistance, hot perforability, impact resistance, etc. of the film may become poor.

Especially preferable copolyesters include copolymers consisting of polymers selected from a group consisting of polyethylene terephthalate (PET), polybutylene terephthalate (PBT) and polyethylene-2,6-naphthalenedicarboxylate (PEN), and polymers obtained by copolymerizing at least one of adipic acid, sebacic acid, dimer acid, 1,4-cyclohexanedicarboxylic acid, cyclohexane-1,4-dimethanol, neopentyl alcohol and diethylene glycol with any of the polymers in the above group. Among them, PET-PEN copolymer, PET-PBT copolymer, PET-polycyclohexane-1,4-dimethyl terephthalate copolymer and PET-dimer acid ethylene glycolate copolymer are preferable since they allow easy adjustment of crystallinity.

The polyester composition of the present invention is characterized by containing specific hydroxy apatite particles.

A hydroxy apatite is a double salt consisting of calcium hydroxide and calcium phosphate, and is clearly different from calcium phosphate in the same sense as that we differentiate common alum from aluminum sulfate. The hydroxy apatite used in the present invention is represented by the following chemical formula:

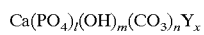

$$Ca(PO_4)_l(OH)_m(CO_3)_nY_x$$

(where Y stands for any optional anions other than phosphate group, hydroxyl group and carbonate group, $l=0.4\sim0.6$, $m=0.1\sim0.4$, $n=0\sim0.2$, $x=0\sim0.2$, $3\times l+m+2\times n+z\times x=2$ (z is the valence of anion(s) Y)).

The hydroxy apatite particles used in the present invention have characteristically the affinity to polyesters which cannot be achieved by the conventional calcium phosphate and its hydrate (e.g., $Ca(H_2PO_4)_2 \cdot H_2O$ and $CaHPO_4 \cdot 2H_2O$), etc., and if said l and m are not in the above ranges, the intended effect cannot be obtained.

The reason is not clear, but is considered to be attributable to the change in polarity, or change in surface free energy or change in crystal structure due to the hydroxyl group incorporated in the structure.

It is preferable that the value of l is 0.5 to 0.6, and that the value of m is 0.15 to 0.25.

It is preferable that the hydroxy apatite of the present invention contains small amounts of carbonate group, halogen group, sulfate group, sulfite group, nitrate group, nitrite group, chlorate group, chlorite group, hypochlorite group, hydrogenphosphate group, dihydrogenphosphate group, acetate group, etc. in addition to phosphate group and hydroxyl group. Especially when the carbonate group content expressed by n in the above chemical formula is 0.005 to 0.2 and/or other anion content expressed by x in the above chemical formula is 0.005 to 0.2, an especially good action can be obtained since a fine structure can be formed on the surfaces. A preferable range of n is 0.005 to 0.12, and a preferable range of x is 0.005 to 0.12. The reason is not clear, but it is considered that the anchoring effect by the texture formed on the surfaces further intensifies the adhesiveness to the polyester. Among said ionic species, any of carbonate group, halogen group, hydrogenphosphate group and dihydrogenphosphate group can be preferably used since the effect is large. Especially carbonate group is preferable. Two or more species can also be used in the above ranges. It is preferable to keep n+x in a range of 0.005 to 0.12.

As far as the object of the present invention is not impaired, calcium may be partially replaced by cations other than calcium. Especially the elements of group IA and group IIA in the periodic table, ammonium and cadmium are typical cation sources. Other impurities can also be contained.

In the wet method described later, a pure hydroxy apatite tends to form primary particles with a high aspect ratio and may inconvenience handling. So, other components than calcium, phosphate group and hydroxyl group may be positively used for controlling it.

An ordinary hydroxy apatite does not have crystal water, but the hydroxy apatite particles used in the present invention can contain crystal water, when the above chemical formula contains hydrate, i.e., crystal water.

The chemical formula of the particles can be identified by isolating them from the polyester composition as required, and using any known analyzing means such as powder X-ray diffraction, infrared spectrometry, thermogravimetric analysis or mass spectrograph.

The hydroxy apatite can be synthesized by a dry method of letting calcium tertiary phosphate and calcium oxide react with each other in a solid phase in water vapor atmosphere or letting calcium secondary phosphate and calcium carbonate react with each other, a hydrothermal method of hydrolyzing calcium secondary phosphate dihydrate (brushite) in an autoclave, or a wet method of adding a phosphate component to a suspension of calcium hydroxide, etc. or a solution of a calcium component. In the present invention, it is preferable to use a wet method for synthesizing the hydroxy apatite. Especially it is preferable to synthesize in the presence of calcium carbonate or calcium halide. The synthesized particles can be used as they are, but after having been synthesized, they can also be calcinated, ground and classified as required. Calcination can be expected to cause the growth of particles or crystallization due to solid phase reaction, but if calcination is effected at a very high temperature, the particles are decomposed into calcium tertiary phosphate and calcium oxide, not allowing the object of the present invention to be achieved.

As described later, the present invention is characterized in that the hydroxy apatite particles have a specific surface area, and furthermore it is preferable that the particles have a pore volume in a specific range. As a method suitable for obtaining particles with such properties, for example, small particles uniform in primary particle diameter are used as the solid calcium component used in the wet method, i.e., calcium hydroxide or calcium carbonate, and a phosphate component is added for reaction in the presence of another component as required. Then, the particles are aged to achieve a desired particle diameter. Such properties of the particles as particle diameter, particle size distribution, specific surface area and pore volume are affected by temperature, pH and stirring conditions. So, by appropriate adjustment, desired particles can be obtained. Also in the dry method or hydrothermal method, the particles can be obtained by appropriately adjusting the burning and crushing conditions and treating the particles by an acid, etc. as required.

The average particle diameter of the hydroxy apatite particles of the present invention is 0.01 to 10 $\mu$m in view of slipperiness, abrasion resistance, electric properties, etc. A preferable range is 0.02 to 5 $\mu$m, a more preferable range is 0.05 to 3 $\mu$m. An especially preferable range is 0.1 to 2 $\mu$m. If the average particle diameter is less than 0.01 $\mu$m, slipperiness and abrasion resistance become poor, and if more than 10 $\mu$m, abrasion resistance, electric properties, hot perforability and impact resistance become poor.

The hydroxy apatite particles can also have two or more peaks in the particle size distribution, and this is rather preferable. It is preferable that the highest one to the lowest one of the two or more peaks observed in the particle size distribution is 1.5 or more. More preferable is 2.0 or more. In this case, the film obtained can be good especially in slipperiness and processability. In this case, the average particle diameter and the relative standard deviation of the particle size distribution described later are defined in the distribution of each of the groups of hydroxy apatite particles, and it is preferable that the respective groups are adjusted to achieve desired values. The average particle diameters and the relative standard deviations of the particle size distributions of the respective groups can be obtained by fitting appropriate curves to the particle size distribution curve of all the hydroxy apatite particles, and mathematically processing.

The specific surface area of the particles is 50 to 500 $m^2/g$ in view of electric properties. A preferable range is 60 to 400 $m^2/g$, and a more preferable range is 70 to 350 $m^2/g$. An especially preferable range is 80 to 300 $m^2/g$. If the specific surface area of the particles is less than 50 $m^2/g$ or more than 500 $m^2/g$, the electric properties, hot perforability, impact resistance and flavor properties of the film become poor.

It is preferable that the pore volume of the particles is 0.15 to 0.7 ml/g. A more preferable range is 0.2 to 0.65 ml/g, and an especially preferable range is 0.3 to 0.6 ml/g. If less than 0.15 l/g or more than 0.7 ml/g, abrasion resistance tends to be poor.

It is preferable in view of the smoothness and electric properties of the film that the relative standard deviation of particle diameters of the hydroxy apatite particles is 0.5 or less. More preferable is 0.3 or less, and especially preferable is 0.2 or less. If the relative standard deviation of particle diameters is 0.5 or less, a good effect can be given to the smoothness, abrasion resistance, electric properties, hot perforability and impact resistance of the film. The relative standard deviation can be kept in this range by intensifying the classification when the particles are obtained by grinding. However, a more preferable range can be achieved by using raw materials smaller in particle diameter and securing homogeneity in particle growing conditions and a proper speed in the wet method.

It is preferable that the hydroxy apatite particles content in the polyester of the present invention is 0.001 to 10 wt %. A more preferable range is 0.005 to 5 wt %, and a further more preferable range is 0.01 to 3 wt %. An especially preferable range is 0.05 to 2 wt %. If the particles content is less than 0.001 wt % or more than 10 wt %, a film with slipperiness, abrasion resistance, electric properties, hot perforability, impact resistance and flavor properties may not be able to be obtained.

The method for letting the polyester of the present invention contain hydroxy apatite particles is not especially limited. This can be achieved, for example, (1) by melt-kneading hydroxy apatite particles and a polyester directly by an ordinary single-screw or double-screw extruder, or pre-mixing them by a blender or mixer, etc. and melt-kneading the mixture, or (2) by melt-kneading hydroxy apatite particles and a polyester directly by an ordinary single-screw or double-screw extruder equiped with vent ports, or pre-mixing them by a blender or mixer, etc., and melt-kneading the mixture, or (3) adding hydroxy apatite particles in the reaction to produce the polyester. Among the above methods, in view of the influence on quality by coarse particles, stability of film quality, etc., it is preferable to let the polyester contain the hydroxy apatite particles by the method of (2) or (3). The method of (3) is more preferable since the method described later can be suitably adopted.

Furthermore, as for the hydroxy apatite particles of the present invention, by adopting a wet method, using a moderately soluble raw material such as calcium carbonate and a raw material with certain solubility in water such as calcium hydroxide, properly adjusting the phosphate component adding method, and temperature, pH and stirring conditions, for control of reaction and growth, preparing an ethylene glycol slurry for addition to the polyester, preferably adding a catalyst for heat treatment, and preferably adjusting polymerization conditions (temperature, stirring speed, etc.), then lumpy particles very uniform in particle diameter before addition become cohesive particles with a preferable primary particle diameter of 5 to 100 nm, or a more preferable primary particle diameter of 5 to 30 nm, and a polyester film of preferably 1.5 or more, more preferably 1.8 or more in the shape index of hydroxy apatite particles can be formed. The reason is not clear. However, if the phenomena are observed in detail, it is considered that at first the outermost layers of the raw material react in the growth of hydroxy apatite particles, to form weak particle boundary layers between very small particles with reaction and growth, for binding the particles to form lumpy particles, that when they are added to the polyester, they are separated at the particle boundaries, to form cohesive particles consisting of very small particles, and that when a film has been formed, the particles are converted into particles with said shape index due to the forming stress. In this case, if the conditions for preparing the particles are not appropriate and the particle boundaries are too strong, then cohesive particles consisting of very small particles cannot be obtained irrespective of the adjustment of adding conditions, and the particles are not deformed by the polyester film forming stress. Even if appropriate particles are obtained, improper addition does not allow the intended effect to be obtained. If the respective conditions are appropriate, the particles adhere to the polyester well and are uniform in particle diameter, being unlikely to allow the formation of voids. So, a polyester film excellent in slipperiness and abrasion resistance can be formed, and a film excellent in electric properties, processability and impact resistance can be obtained.

It is preferable in view of electric properties that the polyester composition of the present invention has a melt specific resistance of $0.01 \times 10^9 \Omega \cdot cm$ or more. If the value is larger, the electric properties become more excellent. A preferable melt specific resistance is $0.1 \times 10^9 \Omega \cdot cm$ or more, and more preferable is $1 \times 10^9 \Omega \cdot cm$ or more. Further more preferable is $2 \times 10^9 \Omega \cdot cm$ or more, and especially preferable is $3 \times 10^9 \Omega \cdot cm$ or more. If the melt specific resistance is less than $0.01 \times 10^9 \Omega \cdot cm$, the film obtained is poor in electric properties.

Methods for keeping the melt specific resistance of the polyester composition of the present invention at $0.01 \times 10^9 \cdot cm$ or more include, for example, (1) letting the polyester contain a metal element and phosphorus element by proper amounts, (2) letting the polyester contain fine particles other than the hydroxy apatite particles, and (3) changing the particle diameter and content of the hydroxy apatite particles of the present invention. Among these methods, the method of (1) is preferable.

A metal element can be caused to be contained in the polyester, for example, by adding a compound containing an alkali metal such as lithium, sodium or potassium or an alkaline earth metal such as magnesium or calcium, or a metal element such as zinc or manganese, specifically a glycol soluble salt compound of a monocarboxylic acid such as lithium acetate, calcium acetate, magnesium acetate or manganese acetate, or a chloride such as lithium chloride or manganese chloride into the reaction system for producing the polyester as a reaction catalyst or additive.

Phosphorus element can be caused to be contained in the polyester, for example, by adding a compound containing phosphorus element such as phosphoric acid, phosphorous acid, phosphonic acid or any of their esters to the reaction system for producing the polyester.

It is preferable that the metal element content in the polyester composition is 10 ppm or more. More preferable is 55 ppm or more, and further more preferable is 60 ppm or more. Especially preferable is 100 ppm or more.

It is preferable that the phosphorus element content in the polyester composition is 10 ppm or more. More preferable is 20 ppm or more, and further more preferable is 50 ppm or more. Especially preferable is 100 ppm or more. If the metal element content and the phosphorus element content are less than 10 ppm respectively, the obtained film may be poor in abrasion resistance and electric properties even if the melt specific resistance of the polyester composition is $0.01 \times 10^9 \Omega \cdot cm$ or more.

The molar ratio of the metal compound to the phosphorus compound (M/P) contained in the polyester composition is not especially limited, but it is preferable that the molar ratio satisfies the following formula, since the obtained film can be more excellent in abrasion resistance and electric properties.

$$0.01 \leq M/P \leq 5$$

(where M is the number of moles of the metal compound calculated from the metal element content (ppm) in the polyester, and P is the number of moles of the phosphorus compound calculated from the phosphorus element content (ppm) in the polyester composition.)

A more preferable molar ratio range is $0.05 \leq M/P \leq 3$, and a further more preferable range is $0.1 \leq M/P \leq 2$. An especially preferable range is $0.1 \leq M/P \leq 1.5$.

Among the metal compounds enumerated for M, for example, the valence of an alkali metal compound is monovalent, and an alkaline earth metal, zinc or manganese compound is a divalent metal compound. The M in the present invention is based on a divalent metal compound when the molar ratio of M/P is specified. Therefore, when a metal compound different in valence is used, the valence must be taken into account for calculation. For example, when an alkali metal compound is used, the value obtained by multiplying the number of moles of the alkali metal by 0.5 is M in the calculation of M/P.

The method for obtaining a film from the polyester composition of the present invention is not especially limited. For example, a film can be produced by melt-extruding the polyester composition into a sheet or further stretching it.

Specific methods for producing a film made of the polyester composition of the present invention are described below. The polyester composition is dried and melt-extruded into a sheet, and the sheet is, in succession, biaxially stretched and heat-treated to make a film. The biaxial stretching can be either longitudinal and lateral sequential stretching or biaxial simultaneous stretching. The proper stretching ratios in the longitudinal direction and the transverse direction are 2.0 to 5.0 times respectively. After completion of biaxial stretching, the film can also be re-stretched in either the longitudinal or transverse direction. In this case, the polyester composition of the present invention and any of various polyesters can be mixed, to change the hydroxy apatite particles content to suit each purpose. Any of the various polyesters mixed can be the same as or different from the polyester contained as a main component in the polyester composition of the present invention.

The film of the present invention can be a single-layer film, but in view of abrasion resistance and electric properties, it can also be a laminate film having at least one film layer (layer A) made of a polyester composition containing hydroxy apatite particles. The thickness of the layer A is not especially limited, but in view of abrasion resistance and electric properties, it is preferable that the thickness is 0.01 to 3 $\mu$m. A more preferable range is 0.05 to 2 $\mu$m, and a further more preferable range is 0.1 to 1.5 $\mu$m. An especially preferable range is 0.1 to 1 $\mu$m. It is preferable in view of electric properties and better flavor properties that the layer A is arranged as an inner layer, but it is preferable that the layer A is arranged at least as the outermost layer, since good slipperiness, abrasion resistance, processability and impact resistance can be highly exhibited as properties of the film.

Furthermore, it is preferable that the relation between the thickness t ($\mu$m) of the layer A of the laminate film and the average particle diameter d ($\mu$m) of the hydroxy apatite particles contained in the layer A is $0.2d \leq t \leq 10d$. A more preferable range is $0.3d \leq t \leq 5d$, and a further more preferable range is $0.5d \leq t \leq 3d$. If the relation is in this range, the above properties become further better.

It is also preferable that the thickness fluctuation of the entire film of the present invention is 20% or less. More preferable is 14% or less, and further more preferable is 10% or less. If the thickness fluctuation is more than 10%, the film used for a capacitor adversely affects electric properties, and the film used for a magnetic recording medium, etc. affects the elongation to a tension, being likely to be poor in flatness.

The polyester composition of the present invention and the film made thereof may contain any other thermoplastic resin such as polyethylene, polypropylene or polystyrene, and various additives, for example, an end sealing agent such as carbodiimide or epoxy compound, ultraviolet light absorber, antioxidant, antistatic agent, surfactant, pigment, fluorescent brightener, etc.

Furthermore, particles other than hydroxy apatite particles, for example, inorganic particles of titanium dioxide, silicone dioxide such as colloidal silica, aluminum oxide, calcium carbonate or aluminum silicate, or organic particles of acrylic acid or styrene, etc. can be preferably contained. It is preferable that the average particle diameter of the particles is 0.01 to 10 µm and that their content is 0.001 to 5 wt %, since a film with good slipperiness and abrasion resistance can be obtained and since especially the process passableness at the time of production or processing is improved. Especially it is preferable that the particle diameter is not larger than ½ of the particle diameter of the hydroxy apatite particles or not smaller than twice said particle diameter.

The polyester film of the present invention can have an adhesive layer formed at least on one side, to be made adhesive. The compounds which can be used as the adhesive layer include, for example, acrylic resins prepared by using acrylic acid, methyl methacrylate or methyl acrylate, etc., polyurethane based resins prepared from isophthalic acid, adipic acid, ethylene glycol or polyethylene glycol, etc. and a diisocyanate, and polyester based resins prepared by using terephthalic acid, 2,6-naphthalenedicarboxylic acid, metal salt of 5-sulfoisophthalic acid, isophthalic acid, adipic acid, ethylene glycol, polyethylene glycol, etc. Among them, a water dispersible or water soluble resin is preferable in view of adhesiveness and handling convenience. For forming the adhesive layer at least on one side of the polyester film, for example, it is preferable to coat the polyester film with an aqueous dispersion or aqueous solution of any of said acrylic resins, polyurethane resins and polyester based resins during the production of the polyester film by reverse coating, gravure coating, die coating or wire bar method, etc. It is preferable in view of adhesiveness that the thickness of the adhesive layer is 0.001 to 5 µm. A more preferable range is 0.01 to 2 µm, and a further more preferable range is 0.05 to 0.5 µm.

When the polyester film of the present invention is used for lamination with a metallic sheet, it is appropriate that the metallic sheet to be laminated is tinned sheet iron, or a sheet of steel or aluminum, etc. For laminating the polyester film onto the metallic sheet, for example, (1) the metallic sheet is heated to higher than the melting point of the film, and the film is stuck to the metallic sheet, the laminate being quickly cooled to make the surface layer of the film in contact with the metallic sheet amorphous, for achieving adhesion, or (2) the film is coated with an adhesive layer as a primer beforehand, and the adhesive layer is stuck to the metallic sheet. The material of the adhesive layer can be, for example, an epoxy adhesive, epoxy-ester based adhesive or alkyd based adhesive.

When the polyester film of the present invention is used for heat sensitive mimeographic paper, it is appropriate that the porous base to have the film of the present invention laminated is Japanese paper, synthetic fiber paper, or any of various woven fabrics and nonwoven fabrics, etc. The film can be stuck onto the porous base, for example, by thermally bonding the porous base and the film, or by bonding using an adhesive such as a vinyl acetate based resin, acrylic resin, urethane based resin or polyester based resin, etc.

Property values in the present invention were measured according to the following methods.

A. Average Particle Diameter and Relative Standard Deviation of Particles

A polyester composition or a film section made thereof was observed at 10,000-fold or larger magnification using a transmission electron microscope (TEM). The section thickness of TEM was about 100 nm, and measurement was effected at 100 or more different fields of view. The average diameter d of the particles was obtained from weight average diameters (equivalent circle diameters).

The relative standard deviations of particle diameters and the average diameter d were defined by the following formula:

$$\sigma = \left\{ \sum_{i=1}^{N} (d_i - d)^2 / N \right\}^{1/2} \Big/ d$$

$$d = \sum_{i=1}^{N} d_i / N$$

B. Specific Surface Area of Particles

The specific surface area was measured according to the BET method using AUTOSORB-1 produced by QUANTA CROME.

C. Pore Volume

Measured according to the mercury-helium method.

D. Metal Element Content and Phosphorus Element Content of Polyester Composition The metal element content and phosphorus element content of a polyester composition were obtained according to the following methods.

(a) Preparation of a Sample for Measuring the Metal Element Content and the Phosphorus Element Content One part of a polyester composition was dissolved by ten parts of o-chlorophenol at 150° C. taking 2 hours, and the obtained solution was centrifuged using an ultracentrifuge at a centrifugal force of 22000 G for 60 minutes. After completion of separation, the supernatant solution was taken without containing the precipitate. The o-chlorophenol in the obtained supernatant solution was removed by drying in vacuum.

(b) Metal Element Content and Phosphorus Element Content

The polyester in the supernatant solution separated from the polyester composition obtained by the above method was decomposed in a wet state, and the metal element content was measured by atomic absorption spectroscopy. The phosphorus element content was measured by phosphorus-molybdic acid blue colorimetry.

E. Intrinsic Viscosity of Polyester Composition

Measured at 25° C. using o-chlorophenol as a solvent.

F. Melting Point of Polyester Composition or Film

A polyester composition or film was crystallized, and the melting point was measured by a differential scanning calorimeter (Model DSC-4 produced by Perkin Elmer) at a heating rate of 16° C./min.

G. Particle Dispersibility in Polyester Composition

The particle dispersibility was evaluated by observing a polyester composition by a transmission electron microscope.

○; Cohesive particles or coarse particles with a diameter not less than twice the initial particle diameter were not observed.

Δ: Cohesive particles or coarse particles with a diameter not less than twice the initial particle diameter were slightly observed.

X: Many cohesive particles or coarse particles with a diameter not less than twice the initial particle diameter were observed.

H. Melt Specific Resistance of Polyester Composition

Measured using a melt resistance measuring instrument shown in FIG. 1. A polyester composition 5 to be measured was put into a container with a pair of electrodes 6 inserted in it. The container was immersed in a heater 4. The polyester composition 5 was molten and retained at 280° C. in $N_2$ gas atmosphere, and a voltage was applied from a DC voltage generator 1. In reference to the readings of an ammeter 2 and a voltmeter 3 in this case, the area of electrodes and inter-electrode distance, the melt specific resistance was obtained from the following formula:

$\rho = (V \times S)/(I \times D)$

ρ: Melt specific resistance (Ω·cm)
V: Applied voltage (V)
S: Area of electrodes (cm²)
I: Measuring current (A)
D: Inter-electrode distance (cm)

I. Thickness Fluctuation of Film

At least at 500 points sampled at random from a film roll, thicknesses were measured, and the thickness fluctuation was obtained from the following formula:

(Maximum thickness−Minimum thickness)/Average thickness×100 (%)

J. Shape Index (a) of Particles

A polyester film section was observed at 10,000-fold or larger magnification using a transmission electron microscope (TEM). The section thickness of TEM was about 100 nm, and measurement was effected at more than 100 different fields of view. For each (cohesive) particle, the maximum diameter $d_{max}$ and the minimum diameter $d_{min}$ were obtained, and the shape index was obtained from the following formula:

$$\alpha = \left\{ \sum_{i=1}^{N} (d_{max}/d_{min}) \right\} / N$$

K. Lamination Thickness of Film

The distribution of particle densities in the depth direction was measured by a secondary ion mass spectrometer, X-ray photoelectric spectroscopy, infrared spectroscopy or confocal microscope, etc. In reference to the surface, the maximum value was obtained in the depth direction, and the thickness at which the particle density became ½ of the maximum value was defined as the lamination thickness. If the lamination thickness is small, it can be decided by film section observation or thin film level difference measuring instrument, etc., not from the distribution of particle densities in the depth direction.

L. Abrasion Resistance of Film

A ½-inch wide tape roll obtained by slitting a film was driven to run at a high speed in contact with a stainless steel SUS-304 guide roll under certain tension, and the abrasion resistance was evaluated in reference to the amount of white powder generated on the surface of the guide roll according to the following criterion:

⊚: White powder was not observed.
○: White powder was slightly observed.
Δ: White powder was observed rather in a large quantity.
X: White powder was observed remarkably M. Scuffing Resistance of Film Ten ½-inch wide tapes obtained by slitting a film were prepared. Each tape was driven to run on a guide pin (surface roughness Ra 100 nm) using a tape running tester (at a running speed of 300 m/min, once, at a contact angle of 60° at a running tension of 60 g). The flaws formed in the film in this case were observed by a microscope, to evaluate the scuffing resistance according to the following criterion:

⊚: Less than two 2.5 μm or wider flaws on the average per tape width.
○: Two to less than five flaws
Δ: Five to less than 10 flaws
X: 10 or more flaws N. Dielectric Breakdown Voltage of Film Measured according to JIS C 2318 using an AC withstand voltage tester.

O. Evaluation of Properties of Film for Lamination with a Metallic Sheet (a) Slipperiness of Film After forming, the state of the film laminated to a metallic can was observed, and the slipperiness was evaluated according to the following criterion:

⊚: Film had neither flaws nor shavings at all.
○: Film had flaws and shavings slightly.
Δ: Film had flaws and shavings significantly.
X: Film had flaws and shavings remarkably.

(b) Heat Resistance of Film

A formed metallic can was heated at 210° C. for 5 minutes, and the state of the film laminated to the metallic can was observed to evaluate the heat resistance according to the following criterion:

⊚: Film did not peel or shrink at all.
○: Film peeled and shrank slightly.
Δ: Film peeled and shrank significantly.
X: Film peeled and shrank remarkably.

(c) Impact Resistance of Film

Ten formed metallic cans were filled with water, and dropped from a height of 1 m onto marble plate. Each of the cans was filled with 1% sodium chloride aqueous solution and a voltage of 6 V was applied between an electrode placed in the aqueous solution and the metallic can, to measure the flowing electric current for evaluating the impact resistance according to the following criterion:

⊚: Nine or more cans showed a current value of 0.2 mA or less.
○: Seven or eight cans showed a current value of 0.2 mA or less.
Δ: Five or six cans showed a current value of 0.2 mA or less.
X: Less than five cans showed a current value of 0.2 mA or less.

(d) Flavor Properties of Film

A cut 150 mm×450 mm film was immersed in a flavor aqueous solution (20 ppm d-limonene aqueous solution) for 5 days, and heat-treated at 80° C. for 30 minutes. The amount of d-limonene adsorbed (μg/g) per 1 g of the film was determined by gas chromatography for evaluating the flavor properties of the film according to the following criterion:

⊚: Amount of adsorbed d-limonene was less than 20.

◯: Amount of adsorbed d-limonene was 20 to less than 25.

Δ: Amount of adsorbed d-limonene was 25 to less than 30.

X: Amount of adsorbed d-limonene was 30 or more.

Furthermore, a formed metallic can was filled with a flavor aqueous solution (20 ppm d-limonene aqueous solution), sealed, allowed to stand for one month, and opened. The change of odor was evaluated by a sensory test according to the following criterion:

⊚: Change of odor was not felt.

◯: Change of odor was little felt.

Δ: Change of odor was felt.

X: Change of odor was felt remarkably.

P. Evaluation of Properties of Film for Heat Sensitive Mimeographic Paper (a) Perforation Sensitivity A film was stuck onto a porous base (Japanese paper), to prepare mimeographic paper. The paper was perforated using a thermal head at an applied energy of 0.09 mJ or 0.12 mJ, to prepare a printing plate of characters. The perforated state of the character image was observed from the film side of the printing plate by a microscope, and the perforation property was evaluated according to the following criterion:

⊚: Intended perforation was effected reliably and good.

◯: Intended perforation was not obtained in very limited portions.

Δ: Intended perforation was not obtained here and there.

X: Intended perforation was not obtained at all.

(b) Clearness of Characters

The printing plate was used for printing, and the clearness of the characters of the prints was visually evaluated according to the following criterion:

○: Characters were perfect in reproduction and thickness uniformity.

Δ: Some characters were imperfect in reproduction and thickness uniformity.

X: Many characters were imperfect in reproduction and thickness uniformity.

The present invention is described below in more detail in reference to examples. In the following examples and comparative examples, the following particles were used.

Chemical Formula

Particles A: $Ca(PO_4)_{0.54}(OH)_{0.18}(CO_3)_{0.1}$
Particles B: $Ca(PO_4)_{0.54}(OH)_{0.18}(CO_3)_{0.1}$
Particles C: $Ca(PO_4)_{0.54}(OH)_{0.18}(CO_3)_{0.1}$
Particles D: $Ca(PO_4)_{0.57}(OH)_{0.19}(CO_3)_{0.05}$
Particles E: $Ca(PO_4)_{0.57}(OH)_{0.19}(CO_3)_{0.05}$
Particles F: $Ca(PO_4)_{0.48}(OH)_{0.16}(CO_3)_{0.2}$
Particles G: $Ca(PO_4)_{0.6}(OH)_{0.2}$
Particles H: $Ca(PO_4)_{0.6}(OH)_{0.2}$
Particles I: $Ca(PO_4)_{0.6}(OH)_{0.2}$
Particles J: $Ca(PO_4)_{0.6}(OH)_{0.2}$
Particles K: $Ca(PO_4)_{0.6}(OH)_{0.2}$
Particles L: $Ca(PO_4)_{0.6}(OH)_{0.2}$
Particles M: $Ca(PO_4)_{0.6}(OH)_{0.2}$
Particles N: $Ca(PO_4)_{0.6}(OH)_{0.2}$
Particles O: $Ca(PO_4)_{0.6}(OH)_{0.2}$
Particles P: $Ca(PO_4)_{0.6}(OH)_{0.2}$
Particles Q: $Ca(PO_4)_{0.6}(OH)_{0.2}$
Particles R: $Ca(PO_4)_{0.6}(OH)_{0.2}$
Particles S: $Ca(PO_4)_{0.59}(OH)_{0.2}(Cl)_{0.05}$
Particles T: $Ca(PO_4)_{0.54}(OH)_{0.18}(HPO_4)_{0.1}$
Particles U: $Ca(PO_4)_{0.55}(OH)_{0.35}$
Particles V: $Ca(PO_4)_2$
Particles W: $3Ca_3(PO_4)_2/CaO$
Particles X: $CaCO_3$
Particles Y: $SiO_2$
Particles Z: Highly crosslinked polystyrene

|  | Average particle size (μm) | σ | Specific surface area (m²/g) | Pore volume (ml/g) |
|---|---|---|---|---|
| Particles A | 0.4 | 0.2 | 160 | 0.45 |
| Particles B | 0.4 | 0.2 | 290 | 0.7 |
| Particles C | 0.4 | 0.3 | 40 | 0.1 |
| Particles D | 0.6 | 0.2 | 130 | 0.4 |
| Particles E | 11.0 | 0.3 | 60 | 0.2 |
| Particles F | 0.4 | 0.2 | 100 | 0.3 |
| Particles G | 0.6 | 0.2 | 130 | 0.5 |
| Particles H | 1.0 | 0.3 | 135 | 0.55 |
| Particles I | 1.5 | 0.1 | 140 | 0.45 |
| Particles J | 0.1 | 0.2 | 150 | 0.4 |
| Particles K | 0.6 | 0.2 | 115 | 0.4 |
| Particles L | 0.6 | 0.2 | 20 | 0.15 |
| Particles M | 0.6 | 0.6 | 30 | 0.2 |
| Particles N | 1.5 | 0.4 | 140 | 0.5 |
| Particles Q | 0.1 | 0.6 | 30 | 0.1 |
| Particles P | 1.0 | 0.2 | 135 | 0.5 |
| Particles Q | 1.0 | 0.3 | 30 | 0.1 |
| Particles R | 0.6 | 0.6 | 100 | 0.12 |
| Particles S | 0.6 | 0.4 | 120 | 0.5 |
| Particles T | 0.6 | 0.2 | 110 | 0.45 |
| Particles U | 0.6 | 0.3 | 100 | 0.35 |
| Particles V | 0.4 | 0.3 | 30 | 0.2 |
| Particles W | 0.6 | 0.3 | 20 | 0.15 |
| Particles X | 0.6 | 0.2 | 20 | 0.1 |
| Particles Y | 0.4 | 0.6 | 180 | 0.12 |
| Particles Z | 0.8 | 0.1 | 15 | ≦0.05 |

EXAMPLE 1

One hundred parts by weight of dimethyl terephthalate and 70 parts by weight of ethylene glycol were used to effect ester interchange reaction using 0.09 part by weight of calcium acetate monohydrate as a catalyst according to a conventional method. After completion of ester interchange reaction, 0.03 part by weight of antimony trioxide, 0.1 part by weight of dimethylphenyl phosphonate as a phosphorus compound and 0.04 part by weight of phosphorous acid were added, and an ethylene glycol slurry of the particles G prepared beforehand was added to achieve a particles content of 0.6 part by weight. In succession, polycondensation reaction was effected according to a conventional method, to obtain a polyester composition with an intrinsic viscosity of 0.62 dl/g. The properties of the obtained polyester composition are shown in Table 1. The calcium content was 200 ppm, and the phosphorus content was 200 ppm. The melt specific resistance of the polyester composition was $5 \times 10^9 \Omega \cdot cm$, and the dispersibility of hydroxy apatite particles in the polyester composition was also very good.

On the other hand, the obtained polyester composition was sufficiently dried, supplied into an extruder, molten at 285° C., extruded as a sheet from a Tee die, and cooled and solidified by a 30° C. cooling drum, to obtain a cast film. The cast film was heated to 95° C., stretched to 3.5 times in the longitudinal direction, heated to 100° C., stretched to 3.6 times in the transverse direction, and heat-treated at 200° C., to obtain a 12 μm thick film. The properties of the obtained film are shown in Table 1. Sections of the film were observed, and cohesive particles with primary particle diameters of 10 to 30 nm were observed. The shape index of the particles was 2.2. The abrasion resistance of the film was as good as two 2.5 μm or wider flaws per tape width. The dielectric breakdown voltage of the film was as excellent as 620 V/μm.

COMPARATIVE EXAMPLE 1

A polyester composition and a film made thereof were obtained as described for Example 1, except that the particles L were used. The properties of the obtained polyester composition and film are shown in Table 1. The film was poor in abrasion resistance and low in dielectric breakdown voltage.

EXAMPLES 2 to 11 AND COMPARATIVE EXAMPLES 2 to 6

Particles-containing polyester compositions different in melt specific resistance and films made thereof were produced as described for Example 1, except that the particles content, metal compound used, phosphorus compound used and their amounts were changed. Their properties are shown in Table 1.

The film of Example 2 was coated with a back coat layer on the side containing the particles, and with an undercoat layer containing colloidal silica and further with a magnetic material later containing a magnetic powder on the side not containing the particles. The film was slit to obtain a magnetic tape. The magnetic tape was good in running property and running stability.

EXAMPLE 12

A hydroxy apatite particles-containing polyester composition was obtained as described for Example 1, except that magnesium acetate tetrahydrate was used as the ester interchange reaction catalyst, that phosphoric acid was used as the phosphorus compound, and that the particles K were used.

On the other hand, the obtained polyester composition, and polyethylene terephthalate synthesized using the same catalyst system and substantially not containing particles were sufficiently dried respectively separately, supplied into an extruder, molten at 285° C., co-extruded from mutually adjacent dies for lamination and fusion bonding, and cooled and solidified, to obtain a cast laminate film. The cast film was heated to 95° C., stretched to 3.5 times in the machine direction, heated to 100° C., stretched to 3.6 times in the transverse direction, and heat-treated at 200° C., to obtain a three-layer laminate film consisting of a 10 µm thick inner polyester layer substantially not containing particles and 1 µm thick outer polyester layers containing hydroxy apatite particles. The thickness fluctuation was 8%. The properties of the obtained film are shown in Table 1.

Another film with a thickness fluctuation of 16% caused by discharge fluctuation was obtained as described for Example 12. The abrasion resistance and scuffing resistance of the film were as good as those of the film of Example 12, but the film caused breakdown 1.2 times more in a dielectric breakdown test in which a high voltage was applied to a wide area of a film. The film was also rather poor in flatness.

EXAMPLE 13

One hundred parts by weight of dimethyl terephthalate and 70 parts by weight of ethylene glycol were used to effect ester interchange reaction using 0.09 part by weight of calcium acetate monohydrate according to a conventional method. After completion of ester interchange reaction, 0.03 part by weight of antimony trioxide, 0.1 part by weight of dimethylphenyl phosphonate as a phosphorus compound and 0.04 part by weight of phosphorous acid were added, and an ethylene glycol slurry of the particles A and an ethylene glycol slurry of the particles Z respectively prepared beforehand were added to achieve a particles A content of 0.3 part by weight and a particles Z content of 0.05 part by weight respectively. In succession, polycondensation reaction was effected according to a conventional method, to obtain a polyester composition with an intrinsic viscosity of 0.62 dl/g. The properties of the obtained polyester composition are shown in Table 1.

On the other hand, the obtained polyester composition, and polyethylene terephthalate prepared as described for Example 1 except that the particles were not substantially contained were sufficiently dried respectively separately, supplied into an extruder, molten at 285° C., co-extruded from mutually adjacent dies for lamination and fusion bonding, and cooled and solidified, to obtain a cast laminate film. The cast film was heated to 95° C., stretched to 3.5 times in the machine direction, heated to 100° C., stretched to 3.6 times in the transverse direction, and heat-treated at 200° C., to obtain a two-layer laminate film consisting of a 10 µm thick polyester layer substantially not containing particles and a 1 µm thick outer polyester layer containing hydroxy apatite particles and crosslinked polystyrene particles. The properties of the obtained film are shown in Table 1 (the abrasion resistance and scuffing resistance on the side containing the particles were measured).

The film was coated with a back coat layer on the side containing the particles and an undercoat layer containing colloidal silica and a magnetic material layer containing a magnetic powder on the side not containing the particles. The film was slit to obtain a magnetic tape. The magnetic tape was better than the tape of Example 2 in running property and running stability, being very excellent.

EXAMPLE 14

Eighty nine parts by weight of dimethyl terephthalate, 12 parts by weight of dimethyl isophthalate and 70 parts by weight of ethylene glycol were used to effect ester interchange reaction using 0.06 part by weight of calcium acetate monohydrate as a catalyst according to a conventional method. After completion of ester interchange reaction, 0.03 part by weight of antimony trioxide and 0.02 part by weight of phosphoric acid as a phosphorus compound, and an ethylene glycol slurry of the particles G prepared beforehand was added to achieve a particles content of 0.2 part by weight. In succession, polycondensation reaction was effected according to a conventional method, to obtain a copolyester composition with an intrinsic viscosity of 0.70 dl/g and a melting point of 225° C. The properties of the obtained copolyester composition are shown in Table 2. The dispersibility of hydroxy apatite particles in the copolyester composition was also very good.

On the other hand, the obtained copolyester composition was sufficiently dried, supplied into an extruder, molten at 280° C., extruded as a sheet from a T die, and cooled and solidified by a 30° C. cooling drum, to obtain a cast film. The cast film was heated to 90° C., stretched to 3.5 times in the machine direction, heated to 105° C., stretched to 3.5 times in the transverse direction, and heat-treated at 190° C., to obtain a 25 µm thick film. Sections of the film were observed, and cohesive particles with primary particle diameters of 10 to 30 nm were obtained. The shape index of the particles was 2.3. In succession, the obtained film was stuck to a 0.25 mm thick steel sheet heated to 260° C., and the laminate was quickly cooled by water. The laminate was deep-drawn with the polyester film kept inside, to produce metallic cans with a diameter of 55 mm. The obtained cans were variously evaluated. The results are shown in Table 3.

COMPARATIVE EXAMPLE 7

A copolyester and a film were obtained as described for Example 14, except that hydroxy apatite particles were not contained. The obtained film was stuck to a metallic sheet, and metallic cans were produced. The properties of the cans are shown in Table 3.

EXAMPLES 15 TO 22 AND COMPARATIVE EXAMPLES 8 TO 13

Copolyester compositions and films made thereof were obtained as described for Example 14, except that the copolyester used, and the kind, particle diameter, specific surface area and content of the particles, etc. were changed as shown in Table 2. The obtained films were stuck to metallic sheets, and metallic cans were produced. The properties of the cans are shown in Table 3.

EXAMPLE 23

The copolyester compositions produced in Examples 14 and 22 were sufficiently dried respectively separately, supplied into an extruder, molten at 280° C., co-extruded from mutually adjacent dies for lamination and fusion bonding, and cooled and solidified, to obtain a cast laminate film. The cast film was heated to 90° C., stretched to 3.5 times in the machine direction, heated to 105° C., stretched to 3.5 times in the transverse direction, and heat-treated at 190° C., to obtain a 20 μm thick two-layer laminate film consisting of a 5 μm layer made of the copolyester composition of Example 14 and a 15 μm thick layer made of the copolyester composition of Example 22. In succession, the obtained film was stuck to a 0.25 mm thick steel sheet heated to 260° C., so that the layer made of the copolyester composition of Example 22 might contact the steel surface. The laminate was deep-drawn with the polyester film kept inside, to produce metallic cans with a diameter of 55 mm. The obtained cans were evaluated, and the results are shown in Table 3.

EXAMPLE 24

Eighty one parts by weight of dimethyl terephthalate, 20 parts by weight of dimethyl isophthalate and 70 parts by weight of ethylene glycol were used to effect ester interchange reaction using 0.06 part by weight of magnesium acetate tetrahydrate as a catalyst according to a conventional method. After completion of ester interchange reaction, 0.03 part by weight of antimony trioxide and 0.02 part by weight of phosphoric acid as a phosphorus compound were added, and an ethylene glycol slurry of the particles H prepared beforehand was added to achieve a particles content of 0.4 part by weight. In succession, polycondensation reaction was effected according to a conventional method, to obtain a copolyester composition with an intrinsic viscosity of 0.62 dl/g and a melting point of 197° C. The properties of the obtained copolyester composition are shown in Table 3. The dispersibility of hydroxy apatite particles in the copolyester composition was also very good.

On the other hand, the obtained copolyester composition was sufficiently dried, supplied into an extruder, molten at 280° C., extruded as a sheet from a T die, and cooled and solidified by a 30° C. cooling drum, to obtain a cast film. The cast film was heated to 90° C., stretched to 3.5 times in the machine direction, heated to 100° C., stretched to 3.5 times in the transverse direction, and heat-treated at 150° C., to obtain a 2 μm thick film. In succession, the obtained film was stuck to a porous base, to prepare heat sensitive mimeographic paper, and the perforability and printing property were evaluated. The results are shown in Table 3.

COMPARATIVE EXAMPLE 14

A copolyester composition and a film made thereof were obtained as described for Example 24, except that the particles Q were added instead of the hydroxy apatite particles H. The obtained film was stuck to a porous base, to prepare heat sensitive mimeographic paper. Its properties are shown in Table 3.

EXAMPLES 25 TO 30 AND COMPARATIVE EXAMPLES 15 to 17

Copolyester compositions and films made thereof were obtained as described for Example 24, except that the copolyester used, and the kind, particle diameter, specific surface area, content, etc. of particles were changed as shown in Table 3. The obtained film was stuck to a porous base, to prepare heat sensitive mimeographic paper samples, and their properties are shown in Table 3.

TABLE 1

| | Properties of polyester composition | | | | | | | Properties of film | | | |
|---|---|---|---|---|---|---|---|---|---|---|---|
| | Particles | | Metal element | Phosphorus element | | Melt specific | Dispersib | | | | Dielectric breakdown |
| | Kind | Content (wt %) | content (ppm) | content (ppm) | M/P | resistance (Ωcm) | ility of particles | Shape index | Abrasion resistance | Scuffing resistance | voltage (V/μm) |
| Example 1 | Particles G | 0.4 | Ca 200 | 200 | 0.78 | 5 × 10⁹ | ○ | 2.2 | ○ | ⊚ | 620 |
| Example 2 | Particles A | 0.4 | Ca 200 | 200 | 0.78 | 6 × 10⁹ | ○ | 2.4 | ⊚ | ⊚ | 640 |
| Example 3 | Particles B | 0.4 | Ca 200 | 200 | 0.78 | 5 × 10⁹ | ○ | 2.5 | ○ | ○ | 620 |
| Example 4 | Particles F | 0.4 | Ca 200 | 200 | 0.78 | 6 × 10⁹ | ○ | 2.3 | ○ | ⊚ | 630 |
| Example 5 | Particles H | 0.4 | Ca 200 | 250 | 0.62 | 5 × 10⁹ | ○ | 1.9 | ○ | ○ | 600 |
| Example 6 | Particles D | 0.4 | Ca 200 | 250 | 0.62 | 7 × 10⁹ | ○ | 2.0 | ⊚ | ⊚ | 630 |
| Example 7 | Particles T | 0.4 | Ca 200 | 250 | 0.62 | 8 × 10⁸ | ○ | 2.1 | ⊚ | ⊚ | 570 |
| Example 8 | Particles I | 0.1 | Ca 200 | 200 | 0.78 | 4 × 10⁹ | ○ | 1.9 | ○ | ○ | 610 |
| Example 9 | Particles U | 0.4 | Ca 200 | 200 | 0.78 | 8 × 10⁸ | ○ | 1.5 | Δ | ○ | 560 |
| Example 10 | Particles J | 0.6 | Mn 80 | 90 | 0.50 | 3 × 10⁹ | ○ | 2.0 | ⊚ | ○ | 600 |
| Example 11 | Particles G | 0.4 | Mg 1000 | 190 | 6.04 | 5 × 10⁶ | Δ | 2.2 | ○ | Δ | 485 |
| Example 12 | Particles K | 0.4 | Mg 90 | 80 | 1.44 | 2 × 10⁹ | ○ | 1.7 | ⊚ | ○ | 605 |
| Example 13 | Particles A Particles Z | 0.3 0.005 | Ca 200 | 200 | 0.78 | 7 × 10⁹ | ○ | 2.7 | ⊚ | ⊚ | 640 |

TABLE 1-continued

| | Properties of polyester composition | | | | | | | Properties of film | | | |
|---|---|---|---|---|---|---|---|---|---|---|---|
| | Particles | | Metal element | Phosphorus element | | Melt specific | Dispersib | | | | Dielectric breakdown |
| | Kind | Content (wt %) | content (ppm) | content (ppm) | M/P | resistance (Ωcm) | ility of particles | Shape index | Abrasion resistance | Scuffing resistance | voltage (V/μm) |
| Comparative Example 1 | Particles L | 0.4 | Ca 200 | 160 | 0.97 | $5 \times 10^8$ | Δ | 1.2 | Δ | Δ | 520 |
| Comparative Example 2 | Particles C | 0.4 | Ca 200 | 170 | 0.91 | $7 \times 10^8$ | ◯ | 1.3 | Δ | Δ | 540 |
| Comparative Example 3 | Particles M | 0.4 | Ca 200 | 170 | 0.91 | $1 \times 10^9$ | Δ | 1.3 | X | X | 510 |
| Comparative Example 4 | Particles X | 0.4 | Ca 200 | 150 | 1.03 | $1 \times 10^8$ | Δ | 1.1 | X | X | 490 |
| Comparative Example 5 | Particles V | 0.4 | Ca 200 | 200 | 0.78 | $6 \times 10^7$ | ◯ | 1.2 | X | X | 480 |
| Comparative Example 6 | Particles W | 0.4 | Ca 200 | 200 | 0.78 | $3 \times 10^5$ | Δ | 1.3 | X | X | 420 |

TABLE 2

| | Properties of polyester composition | | | | | | | | | | |
|---|---|---|---|---|---|---|---|---|---|---|---|
| | Particles | | Polyester resin composition (mol %) | | | | | | Intrinsic viscosity | Melting point | Dispersibility |
| | Kind | Content (wt %) | TPA | IPA | NDCA | DA | EG | CHDM | (dl/g) | (° C.) | of particles |
| Example 14 | Particles G | 0.2 | 88 | 12 | | | 100 | | 0.7 | 225 | ◯ |
| Example 15 | Particles D | 0.2 | 88 | 12 | | | 100 | | 0.7 | 225 | ◯ |
| Example 16 | Particles T | 0.2 | 88 | 12 | | | 100 | | 0.7 | 225 | ◯ |
| Example 17 | Particles R | 0.2 | 88 | 12 | | | 100 | | 0.7 | 225 | ◯ |
| Example 18 | Particles H | 0.1 | 85 | 15 | | | 100 | | 0.7 | 217 | ◯ |
| Example 19 | Particles N | 0.1 | 75 | 25 | | | 100 | | 0.7 | 190 | ◯ |
| Example 20 | Particles B | 0.2 | 100 | | | | 88 | 12 | 0.7 | 226 | ◯ |
| Example 21 | Particles K | 0.4 | | 15 | 85 | | 100 | | 0.7 | 227 | ◯ |
| Example 22 | Particles P | 0.1 | 90 | | | 10 | 100 | | 0.75 | 235 | ◯ |
| Example 23 | Particles G | 0.2 | 88 | 12 | | | 100 | | 0.7 | 225 | ◯ |
| | Particles P | 0.1 | 90 | | | 10 | 100 | | 0.75 | 235 | ◯ |
| Comparative Example 7 | Nil | — | 88 | 12 | | | 100 | | 0.7 | 225 | — |
| Comparative Example 8 | Particles X | 0.2 | 88 | 12 | | | 100 | | 0.7 | 225 | Δ |
| Comparative Example 9 | Particles E | 0.2 | 88 | 12 | | | 100 | | 0.7 | 225 | ◯ |
| Comparative Example 10 | Particles Y | 0.2 | 88 | 12 | | | 100 | | 0.7 | 225 | X |
| Comparative Example 11 | Particles O | 0.3 | 100 | | | | 88 | 12 | 0.7 | 226 | ◯ |
| Comparative Example 12 | Particles V | 0.2 | 88 | 12 | | | 100 | | 0.7 | 225 | ◯ |
| Comparative Example 13 | Particles W | 0.2 | 88 | 12 | | | 100 | | 0.7 | 225 | ◯ |
| Example 24 | Particles H | 0.4 | 80 | 20 | | | 100 | | 0.62 | 197 | ◯ |
| Example 25 | Particles A | 0.4 | 80 | 20 | | | 100 | | 0.62 | 197 | ◯ |
| Example 26 | Particles F | 0.4 | 80 | 20 | | | 100 | | 0.62 | 197 | ◯ |
| Example 27 | Particles G | 0.6 | 85 | 15 | | | 100 | | 0.62 | 217 | ◯ |
| Example 28 | Particles H | 0.4 | 65 | 35 | | | 100 | | 0.62 | 155 | ◯ |
| Example 29 | Particles H | 0.4 | 100 | | | | 80 | 2.0 | 0.62 | 195 | ◯ |
| Example 30 | Particles S | 0.4 | 100 | | | | 80 | 20 | 0.62 | 195 | ◯ |
| Comparative Example 14 | Particles Q | 0.4 | | 20 | | | 100 | | 0.62 | 200 | ◯ |
| Comparative Example 15 | Particles X | 0.4 | 80 | 20 | | | 100 | | 0.62 | 197 | Δ |
| Comparative Example 16 | Particles Y | 0.4 | 80 | 20 | | | 100 | | 0.62 | 197 | X |
| Comparative Example 17 | Particles V | 0.4 | 80 | 20 | | | 100 | | 0.62 | 197 | ◯ |

TPA: Terephthalic acid, IPA: Isophthalic acid, NDCA: Naphthalene-2,6-dicarboxylic acid, DA: Dimer acid, EG: Ethylene glycol, CHDM: 1,4-cyclohexanedimethanol

TABLE 3

Properties of polyester film

| | Shape index | Abrasion resistance | Scuffing resistance | Slipperiness | Heat resistance | Impact resistance | Flavor properties, adsorption test | Flavor properties sensory test | Perforability | Printing property |
|---|---|---|---|---|---|---|---|---|---|---|
| Example 14 | 2.3 | ○ | ◎ | ◎ | ◎ | ◎ | ◎ | ◎ | | |
| Example 15 | 2.1 | ◎ | ◎ | ◎ | ◎ | ◎ | ◎ | ◎ | | |
| Example 16 | 2.1 | ◎ | ◎ | ◎ | ◎ | ◎ | ◎ | ○ | | |
| Example 17 | 1.9 | ○ | ○ | ○ | ○ | ○ | ◎ | ◎ | | |
| Example 18 | 1.9 | ○ | ○ | ◎ | ◎ | ○ | ◎ | ◎ | | |
| Example 19 | 1.8 | ○ | ○ | ◎ | ◎ | ○ | ◎ | ◎ | | |
| Example 20 | 2.5 | ○ | ○ | ◎ | ◎ | ○ | ◎ | ◎ | | |
| Example 21 | 1.7 | ○ | △ | ◎ | ◎ | ○ | ◎ | ◎ | | |
| Example 22 | 2.0 | ○ | ○ | ◎ | ○ | ◎ | ◎ | ◎ | | |
| Example 23 | 2.2 | ◎ | ○ | ◎ | ◎ | ◎ | ◎ | ◎ | | |
| Comparative Example 7 | — | X | X | X | ○ | △ | △ | △ | | |
| Comparative Example 8 | 1.1 | X | X | △ | △ | X | X | X | | |
| Comparative Example 9 | 1.5 | X | X | X | △ | X | ○ | ○ | | |
| Comparative Example 10 | 1.3 | X | △ | △ | ○ | △ | △ | △ | | |
| Comparative Example 11 | 1.3 | △ | △ | ○ | ○ | ○ | ○ | ○ | | |
| Comparative Example 12 | 1.2 | △ | △ | X | X | X | △ | X | | |
| Comparative Example 13 | 1.3 | X | X | X | X | X | X | X | | |
| Example 24 | 1.9 | ○ | ○ | | | | | | ◎ | ○ |
| Example 25 | 2.3 | ◎ | ◎ | | | | | | ◎ | ○ |
| Example 26 | 2.3 | ○ | ◎ | | | | | | ◎ | ○ |
| Example 27 | 2.2 | ○ | ○ | | | | | | ○ | ○ |
| Example 28 | 2.0 | ○ | ○ | | | | | | ○ | ○ |
| Example 29 | 2.0 | ○ | ○ | | | | | | ◎ | ○ |
| Example 30 | 2.1 | ◎ | ◎ | | | | | | ◎ | ○ |
| Comparative Example 14 | 1.2 | △ | △ | | | | | | ○ | ○ |
| Comparative Example 15 | 1.1 | X | X | | | | | | △ | △ |
| Comparative Example 16 | 1.3 | X | △ | | | | | | △ | X |
| Comparative Example 17 | 1.2 | △ | △ | | | | | | △ | X |

INDUSTRIAL APPLICABILITY

The present invention relates to a polyester composition containing hydroxy apatite particles having a specific particle diameter, specific surface area and chemical formula, and a film made thereof. A film excellent in slipperiness and abrasion resistance, and also remarkably improved in electric properties, perforability as heat sensitive mimeographic paper and laminatability to a metallic sheet can be obtained. The film can be suitably used for magnetic recording media, capacitors, heat sensitive mimeography, lamination to metallic sheets, and other general industrial applications.

We claim:

1. A polyester composition, comprising a thermoplastic polyester resin and hydroxy apatite particles with an average particle diameter of 0.01 to 10 μm and a specific surface area of 50 to 500 m²/g and represented by the following chemical formula:

$$Ca(PO_4)_l(OH)_m(CO_3)_nY_x$$

(where Y stands for any optional anions other than phosphate group, hydroxyl group and carbonate group, l=0.4~0.6, m=0.1~0.4, n=0~0.2, x=0~0.2, 3×l+m+2×n+z× x=2 (z is the valence of anion(s) Y)).

2. A polyester composition, according to claim 1, wherein n=0.005~0.2 and/or x=0.005~0.2 in the chemical formula of the hydroxy apatite particles.

3. A polyester composition, according to claim 1 or 2, wherein the relative standard deviation of particle diameters of the hydroxy apatite particles is 0.5 or less.

4. A polyester composition, according to claim 1, wherein the pore volume of the hydroxy apatite particles is 0.15 to 0.7 ml/g.

5. A polyester composition, according claim 1, wherein the hydroxy apatite particles are formed as cohesive particles with primary particle diameters of 5 to 100 nm.

6. A polyester composition, according to claim 1, wherein the thermoplastic polyester resin is a copolyester.

7. A polyester composition, according to claim 1, wherein the copolyester resin is at least one selected from PET-PEN copolymer, PET-PBT copolymer, PET-polycyclohexane-1,4-dimethyl terephthalate copolymer, and PET-dimer acid ethylene glycolate.

8. A polyester composition, according to claim 1, wherein the melting point is in a range of 100 to 260° C.

9. A polyester composition, according to claim 1, wherein the melt specific resistance is 0.01×10⁹Ω·cm or more.

10. A polyester composition, according to claim 1, wherein particles with an average diameter of 0.01 to 10 μm are contained by 0.001 to 5 wt % in addition to the hydroxy apatite particles.

11. A polyester film, comprising the polyester composition stated in claim 1.

12. A polyester film with a laminate structure, comprising at least one layer made of the polyester composition stated in claim 1.

13. A polyester film with a laminate structure, comprising at least one layer made of the polyester composition stated in claim 1, as the outermost layer.

14. A polyester film, according to claim 11, wherein the thickness fluctuation of the film is 10% or less of the overall thickness.

15. A polyester film, according to claim 11, wherein the shape index of the hydroxy apatite particles is 1.5 or more.

16. A polyester film for capacitors, comprising the film stated in claim 11.

17. A polyester film for heat sensitive mimeography, comprising the film stated in claim 1.

18. A polyester film for lamination to metallic sheets, comprising the film stated in claim 11.

19. A polyester film for magnetic recording media, comprising the film stated in claim 11.

* * * * *

UNITED STATES PATENT AND TRADEMARK OFFICE
CERTIFICATE OF CORRECTION

PATENT NO. : 6,048,626
APPLICATION NO. : 09/297349
DATED : April 11, 2000
INVENTOR(S) : Toshihiro Tsuzuki et al.

It is certified that error appears in the above-identified patent and that said Letters Patent is hereby corrected as shown below:

In Column 7, between lines 12 and 13, please insert:

--Drawings

Fig. 1 shows an apparatus for measuring melt specific resistance of a polyester composition in accordance with this invention.--

In Column 24, at line 10, please insert:

--20. A polyester film, according to Claim 12, wherein the thickness fluctuation of the film is 10% or less of the overall thickness.

21. A polyester film for capacitors, comprising the film stated in Claim 12.

22. A polyester film for heat sensitive mimeography, comprising the film stated in Claim 13.

23. A polyester film for lamination to metallic sheets, comprising the film stated in Claim 12.

24. A polyester film for magnetic recording media, comprising the film stated in Claim 13.

25. A polyester film, according to Claim 13, wherein the thickness fluctuation of the film is 10% or less of the overall thickness.

26. A polyester film, according to Claim 13, wherein the shape index of the hydroxy apatite particles is 1.5 or more.

UNITED STATES PATENT AND TRADEMARK OFFICE
CERTIFICATE OF CORRECTION

PATENT NO. : 6,048,626
APPLICATION NO. : 09/297349
DATED : April 11, 2000
INVENTOR(S) : Toshihiro Tsuzuki et al.

It is certified that error appears in the above-identified patent and that said Letters Patent is hereby corrected as shown below:

27. A polyester film for capacitors, comprising the film stated in Claim 13.
28. A polyester film for lamination to metallic sheets, comprising the film stated in Claim 13.--

Signed and Sealed this

First Day of August, 2006

JON W. DUDAS
*Director of the United States Patent and Trademark Office*